United States Patent
Errico

(10) Patent No.: US 6,809,246 B2
(45) Date of Patent: Oct. 26, 2004

(54) ELECTRONIC MUSIC DISPLAY DEVICE

(75) Inventor: Michael J. Errico, 30 Brookside Dr., Plandome, NY (US) 11030

(73) Assignee: Michael J. Errico, Plandome, NY (US)

( * ) Notice: Subject to any disclaimer, the term of this patent is extended or adjusted under 35 U.S.C. 154(b) by 0 days.

(21) Appl. No.: 10/231,370

(22) Filed: Aug. 30, 2002

(65) Prior Publication Data

US 2004/0040433 A1 Mar. 4, 2004

(51) Int. Cl.[7] .......................... G09B 15/00; G09B 15/02
(52) U.S. Cl. ...................... 84/477 R; 84/609; 84/483.2
(58) Field of Search .................... 84/470 R, 471 R, 84/477 R, 483.1, 483.2, 601–602, 609, 649

(56) References Cited

U.S. PATENT DOCUMENTS

| | | | |
|---|---|---|---|
| 4,350,070 A | | 9/1982 | Bahu |
| 4,931,957 A | | 6/1990 | Takagi et al. |
| 5,203,248 A | | 4/1993 | Carr et al. |
| 5,213,508 A | | 5/1993 | Turner et al. |
| 5,233,333 A | | 8/1993 | Borsuk |
| 5,315,911 A | | 5/1994 | Ochi |
| 5,400,687 A | * | 3/1995 | Ishii .......................... 84/477 R |
| 5,604,322 A | | 2/1997 | Kikuchi |
| 5,663,748 A | | 9/1997 | Huffman et al. |
| 5,665,927 A | | 9/1997 | Taki et al. |
| 5,689,077 A | | 11/1997 | Jasinski |
| 5,739,814 A | | 4/1998 | Ohara et al. |
| 5,760,323 A | * | 6/1998 | Romero et al. ........... 84/470 R |
| 5,773,741 A | | 6/1998 | Eller et al. |
| 5,877,746 A | | 3/1999 | Parks et al. |
| 6,046,394 A | | 4/2000 | Hino |
| 6,072,114 A | | 6/2000 | Kunimasa |
| 6,072,461 A | | 6/2000 | Haran |
| 6,084,168 A | * | 7/2000 | Sitrick ....................... 84/477 R |
| 6,137,041 A | | 10/2000 | Nakano |
| 6,143,972 A | | 11/2000 | Ladyjonsky |
| 6,156,964 A | | 12/2000 | Sahai et al. |
| 6,160,540 A | | 12/2000 | Fishkin et al. |
| 6,243,074 B1 | | 6/2001 | Fishkin et al. |
| 6,243,075 B1 | | 6/2001 | Fishkin et al. |
| 6,268,857 B1 | | 7/2001 | Fishkin et al. |
| 6,281,420 B1 | | 8/2001 | Suzuki et al. |
| 6,297,805 B1 | | 10/2001 | Adler et al. |
| 6,297,838 B1 | | 10/2001 | Chang et al. |
| 6,313,387 B1 | | 11/2001 | Yamauchi |
| 6,348,648 B1 | | 2/2002 | Connick, Jr. |
| 6,380,471 B2 | | 4/2002 | Matsumoto |

* cited by examiner

Primary Examiner—Marlon T. Fletcher
(74) Attorney, Agent, or Firm—Nixon Peabody, LLP; Marc S. Kaufman; Carlos R. Villamar

(57) ABSTRACT

An electronic music display device having a scanning device for inputting music score image data from a printed musical score. A memory device receives and stores the inputted music score image data. The data is segregated into sections and a performance sequence is programmed whereby a performer can program repeats and forward or backward skips in the music score image data. A display displays at least two pages of the music score image data. An actuator is manipulated by the performer to progress the display to display the sections in accordance with the sequence. Upon each manipulation of the actuator a pre-programmed part of the musical score is displayed. The performer is thus able to smoothly progress between pages of the score, repeat previously preformed parts, and skip to a different part of the score by merely pressing the actuator.

33 Claims, 5 Drawing Sheets

ELECTRONIC MUSIC DISPLAY DEVICE

BACKGROUND OF THE INVENTION

1. Field of the Invention

The present invention relates to an electronic musical score display device whereby performance musicians can scan personal music manuscripts, including notations, into a graphic file and program the sequence of display of the score in accordance with a desired performance plan, i.e. sequence.

2. Description of Related Art

Performance musicians, for example, vocalists, pianists, violinists, chamber musicians, orchestra members, etc., often use music "manuscripts" which they have personalized. In particular, performers will mark fingerings, technical directions, dynamic directions, and other personal performance suggestions directly on the hard copy of the music score. These manuscripts are accumulated over long periods of time and become the essential memory of the musician's experience. Thus, manuscripts embody a musician's personal skill and experience and often are irreplaceable. Often, manuscripts are original creations and arrangements and thus represent the originality and individuality of the performer.

When a musician performs publicly he/she frequently performs with the music sheets directly in front of him/her. During the performance, the manual turning of pages can be clumsy and distracting to both the performer and the audience alike. For example, pianists need page turners who must turn the sheets at appropriate times, pages fall off or are blown off the music stand, and the rustling of the pages as they are turned creates unwanted background noise.

To solve the above problems, electronic music stands have been developed to store the musical data and display the same without the need for a hard copy of the score. U.S. Pat. No. 5,760,323 discloses an electronic music display whereby an optical scanner can be used to input sheet music into a computer. A display permits two simultaneous pages of music to be viewed. An actuator means is controlled by a foot of the performer and includes dual foot switches to advance displayed pages of musical notes either forward or backward. The performer can also program a time interval at which the displayed musical notes are advanced automatically.

However, with such a music stand the performer must advance or move backward page-by-page progressively in the score, in a manner similar to a hardcopy musical score, to get to a particular part of the score. For example, if the performer wishes to repeat a refrain, he/she must press the actuating means as many times as necessary to move backward or forward to the beginning of the refrain. Although such action may be less disruptive than manually turning a hard copy of a music sheet, the repetitive pressing of a foot pedal can be more confusing and just as distracting as the manual page turning alternative.

Thus, there is a need for an electronic music display whereby the performer can use an actuating means to repeat parts or move forward or backward to any place in the score in a predetermined manner corresponding to the desired performance sequence.

SUMMARY OF THE INVENTION

It is therefore an object of the present invention to electronically display a musical score and allow for the musician to repeat certain sections or move forward or backward to a certain part or section of the score in a predetermined manner by an actuating means.

Another object of the present invention is to enable a performer to pre-program a performance sequence in an electronic musical display device.

Still another object of the present invention is to enable a performer to scan a personal manuscript, complete with hand written notations, and store and display the same in a musical display device.

In achieving these and other objects of the present invention there is provided an electronic musical display device comprising an input means for inputting music score data, memory means for storing the inputted music score data, and control means for segregating the music score data. A performance sequence is programmed whereby a performer can program a performance sequence of the music score data in accordance with a desired performance. Display means display the music score data in accordance with the performance sequence.

An actuator can be manipulated by the performer to repeat a portion of the music score data and move forward or backward in the music score image data step-by-step in the predetermined performance sequence. The actuator can be a foot pedal located on the floor near the performer. By pressing the foot pedal the performer can progress through the preprogrammed performance sequence merely by pressing the pedal once for each step. For example, if the performer wanted to repeat the first and second pages after the fourth page of the score, he or she could program the control means to return to that particular portion of the score in response to the third tap of the pedal. In such an example, the first tap of the pedal causes the first and second pages of the score to be displayed. The second tap causes the third and forth pages to be displayed, and the third tap causes the first and second pages to be displayed again.

In achieving these and other objects of the present invention there is also provided a method for advancing through pages of music score data in an electronic music display device including the step of inputting musical score data into a memory device for storing the inputted music score data. The music score data stored in the memory device is then segregated into sections. A performance sequence is determined whereby a performer can step through the sections in accordance with a desired performance. An actuating device is manipulated to progress through the performance sequence.

BRIEF DESCRIPTION OF THE DRAWINGS

These and other objects, features, aspects, and advantages of the present invention will become more apparent from the following detailed description of the preferred embodiment relative to the accompanied drawings, in which.

DESCRIPTION OF THE PREFERRED EMBODIMENTS

Figure 1:
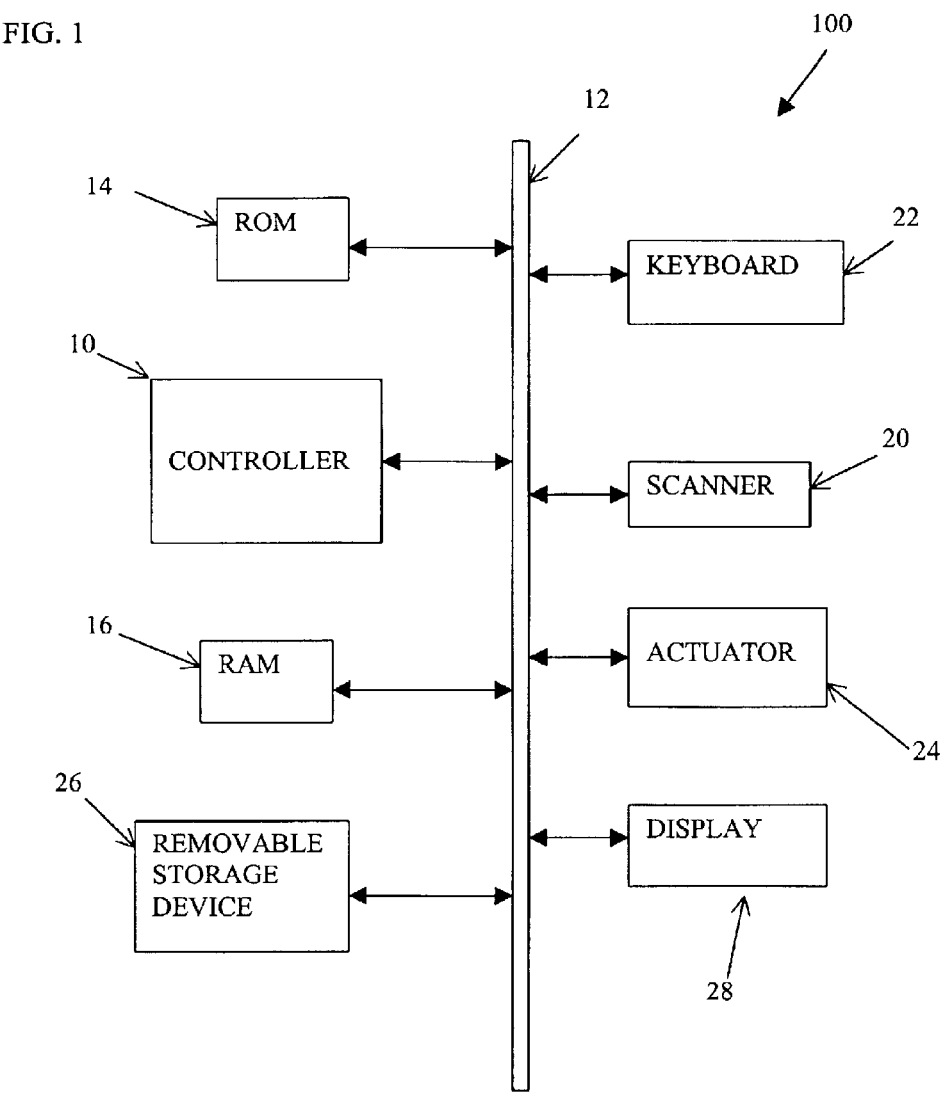
FIG. 1 is a schematic diagram of the hardware configuration of the electronic music display device according to a preferred embodiment of the present invention.

FIG. 1 is a schematic diagram of the hardware configuration of the electronic music display 100 according to the preferred embodiment. A computer control means or controller 10 contains the basic processor for sequencing the music score. Controller 10 accepts the scanned music, segregates the music into sections, and allows the performer to plan the performance sequence, i.e., step-by-step progression through the sections. A software program is executed by controller 10 to execute the method described below and stored in a memory such as ROM 14.

A memory, such as RAM 16 serves as a workspace and temporarily stores various input information or musical score data. Removable external storage device 26, such as a floppy disc drive (FDD), a CD-ROM, a CD-RW (rewritable CD-ROM), or a hard disc drive (HDD), or other storage medium, stores the musical score data after scanning, in digital form for example. The various memory devices described above are only examples. The various information and executable programs can be stored in any type of storage device and any combination thereof. For example ROM 14, RAM 16, and removable storage device 26 can be incorporated into a single device. Scanner 20 optically scans the performance score from the printed form and produces the musical score image data which is stored in RAM 16 in a known manner. The score could also be input via other input means such as a music editor program that receives instructions from a keyboard, mouse or the like 22.

Figure 2:
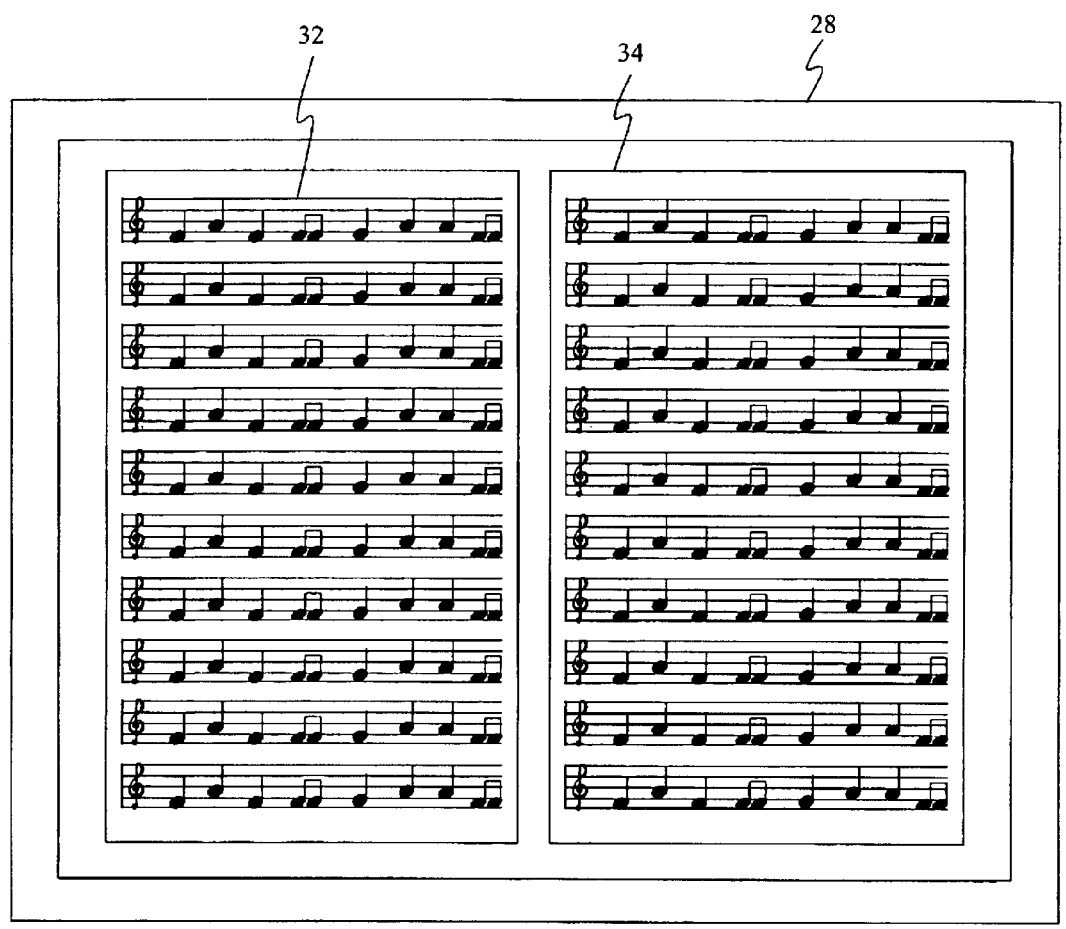
FIG. 2 illustrates a musical score displayed on a display of the device of FIG. 1.
Figure 3:
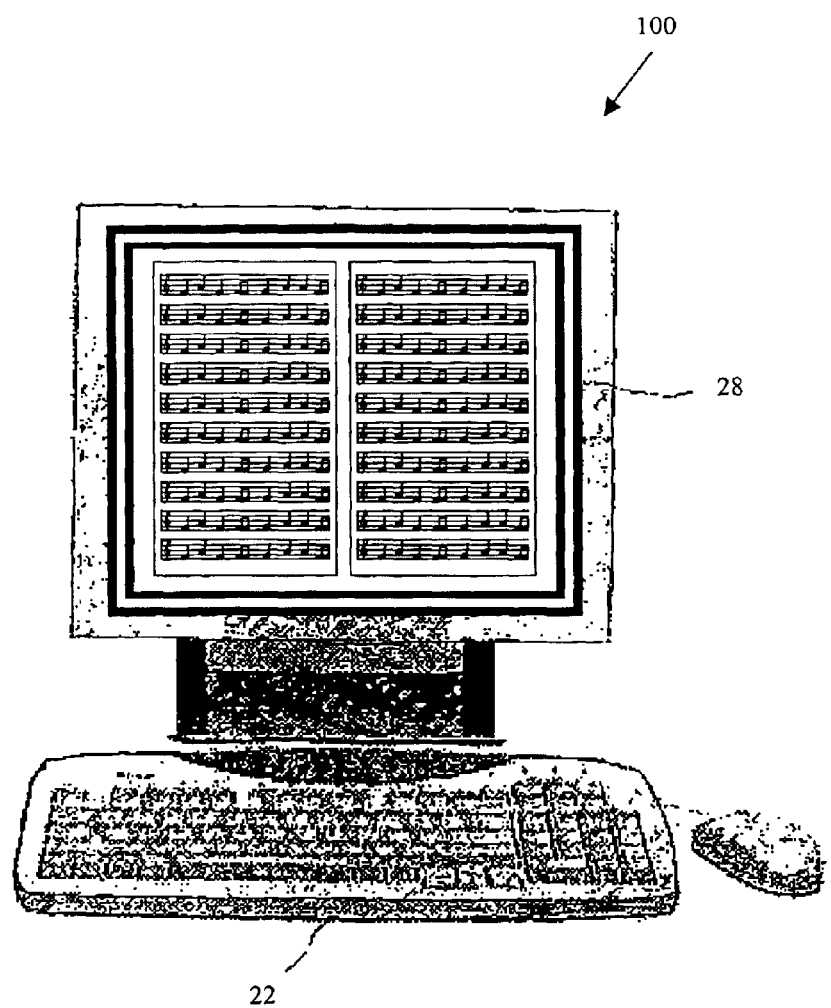
FIG. 3 is a perspective view of the display device of FIG. 1.
Figure 4:
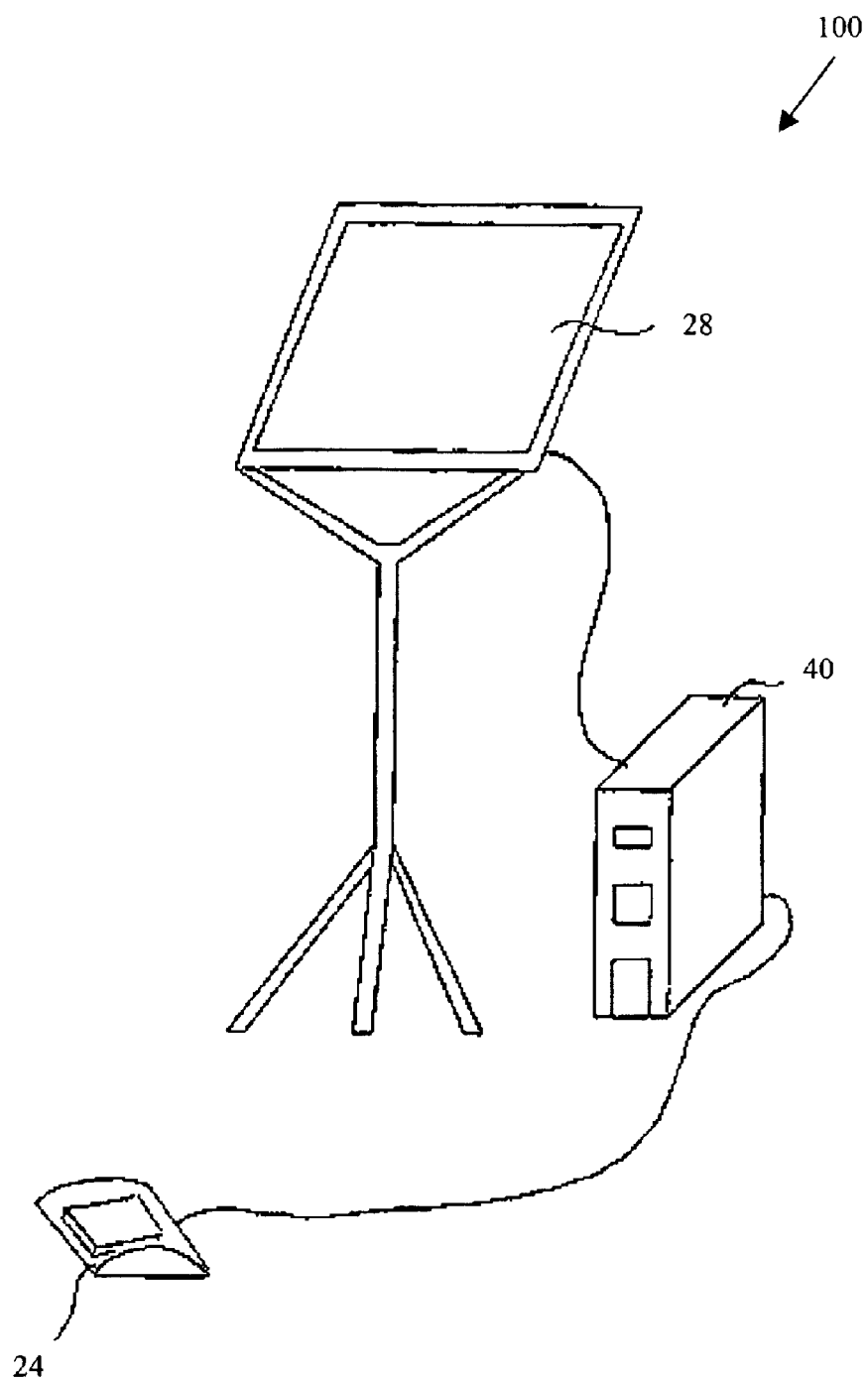
FIG. 4 is a perspective view of another embodiment of the display of FIG. 1.

Display 28, also shown in FIGS. 2–4, can be an LCD screen, a CRT or other device capable of displaying one or more sheets 32, 34 of the musical score. Preferably display 28 is large enough to simultaneously display two sheets of a standard music score side-by-side as illustrated in FIGS. 2 and 3, for example, 12×18 inches. Moreover, it should be appreciated that the display area can be divided to show a block containing additional data. While not illustrated in detail, the displayed score can include handwritten text or other indicia that is specific to the musician.

A keyboard or other input device 22 allows the performer to communicate with CPU 10 to input textual notes, or other information into the score. The performer can also issue commands through keyboard 22 to retrieve a score from the memory or to perform other functions. The various elements can communicate through bus 12.

As shown in FIG. 3, music display 100 can be embodied in a personal computer or other device programmed in the desired manner. Although a desktop computer is illustrated, it should be appreciated that a handheld, laptop or other device can be used by the performer. In this example, actuator 24 can be a conventional mouse, a key of keyboard 22 or another peripheral device. The embodiment of FIG. 3 can be used in connection with scanner 20 to serve as a device for creating the performance sequence display and saving the same to media, such as a CD-ROM. In particular, the musician can bring their manuscript to the device of FIG. 3, import the score and program the performance sequence as described below with respect to FIG. 5. The sequence can then be saved along with the score image for playback during a performance as described below. However, the device of FIG. 3 can also be used to display the performance sequence.

FIG. 4, illustrates another embodiment in which all elements except for display 28 and actuator 24 are integrated in chassis 40. This embodiment can be used to play back the performance sequence stored in the manner described with respect to the embodiment of FIG. 3. In particular, the performance sequence stored on media can be read by the device of FIG. 4 and the score can be displayed in the performance sequence as described with respect to FIG. 5. For example, a CD-ROM can be read by a CD drive of the device. Actuator 24 is connected to the controller 8 and allows the progression of the performance plan outlined by the performer. Actuator 24 can be a foot pedal placed on the floor near the performers foot. On a piano it could be located on the floor as a fourth foot pedal on the left and positioned to allow the left foot to advance the manuscript pages even when the soft pedal is being held down. Less sophisticated foot pedals can be used for most other instruments. Note that display 28 can be a flat panel display adapted to fit on a conventional music stand.

CPU 10 acts upon instructions from ROM 14 to cause desired sections of the score stored in storage device 26 to be displayed on display 28 in response to a signal from actuator 24. With each tap of actuator 24, the performer progresses through the pre-programmed performance plan. For example, a first tap of the foot pedal may advance to page three of the score. A next tap of the pedal could cause page three to be repeated. A third tap of the pedal could cause page five of the musical score to be displayed directly after page three. A fourth tap of the pedal would allow page four of the score to be displayed. Any performance sequence can be programmed as described in detail below.

Figure 5:
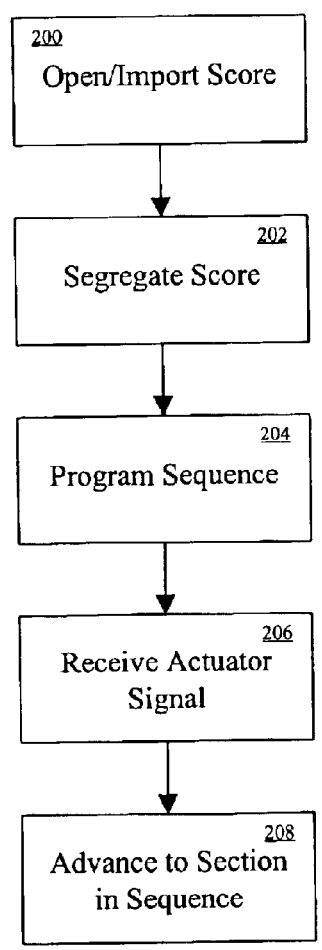
FIG. 5 is a flow chart illustrating a method, according to the preferred embodiment, of programming and displaying a performance sequence.

Next, referring to the flow chart of FIG. 5, the process for programming the performance sequence and displaying music in accordance with the program is described according to the preferred embodiment. The process begins when the performer, in preparation of his/her performance, takes a personal manuscript of a music score to scanner 20 and scans it in, for example, two pages at a time (step 202). The music data can be stored as a graphics file in storage device 26. Alternatively, the performer can choose to open an existing graphics file or import a new file that has been inputted as described above or in another manner. Next, the music score data is segregated into sections (step 202). For example, each page or specific musically related portions, such as several bars, a refrain, or the like, can be designated as a separate section. Sections can be segregated in any manner using a standard user interface and input device 22. For example, input device 22 can be used to highlight a portion of the score and a section button of a user interface can then be pressed. Subsequently, the performance is programmed to include repeats, skips and any other performance sequence as desired (step 204). The music score data and sequence can be saved as a single or multiple files. Steps 200, 202, and 204 can be accomplished by the device illustrated in FIG. 3. Subsequently, the recorded music score and performance sequence can be transferred to a performance device, such as the device illustrated in FIG. 4, and the score can be displayed on screen 28 for performance. As the music performance progresses, pressure on the actuator sends a signal (step 206) which advances the display to the next section in the sequence in accordance with the performance sequence (step 208). The sequence can be programmed in any manner that results in an order or priority being assigned to the various sections.

The invention can be implemented on any type of computer hardware and/or software. For example, a personal computer can be used. Alternatively, dedicated components, such as a controller and specialized display can be used. The sections of the data can correspond to any portion of the music and can be marked in any manner. For example, flags, tags or other indicia can be used. The data can be stored as tree or other structure. The sequence can refer to the sections in any manner. For example, the sections can be numbered and the sequence can be a string of the section numbers in the desired order. The creation/recording of the musical score data and the performance sequence can be accomplished on a device which is separate from or integrated with the device used for displaying the music score in accordance with the performance sequence.

Although the present invention has been described in relation to particular embodiments thereof, many other variations and modifications and other uses will become apparent to those skilled in the art. The present invention therefore is defined by the appended claims and legal equivalents.

What is claimed is:

1. An electronic music display device comprising:

input means for inputting music score data;

memory means for storing the inputted music score data;

control means for segregating the music score data into sections by allowing a user to select said sections and for programming said sections into a performance sequence in accordance with a desired performance determined by said user;

display means for displaying the music score data; and actuating means in communication with the control means for advancing the display of the sections in accordance with the performance sequence, wherein said sections can be played in any particular order as determined by said user, including a non-sequential forward or reverse order within the music score data.

2. The electronic music display device of claim 1, wherein the input means comprises a scanning device in communication with the control means for inputting the music score data into the memory means as image data.

3. The electronic music display device of claim 2, wherein the image data includes musician specific notations.

4. The electronic music display device of claim 1, wherein said display means comprises a display which permits two pages of the music score image data to be viewed simultaneously.

5. The electronic music display device of claim 1, wherein said actuating means comprises an actuator manipulated by the performer.

6. The electronic music display device of claim 5, wherein said actuator comprises a foot pedal.

7. The electronic music display device of claim 1, wherein the sections correspond to pages of the music score.

8. The electronic music display device of claim 1, wherein said control means allows said user to select said sections by highlighting said sections.

9. The electronic music display device of claim 1, wherein said user includes a musician.

10. A method for advancing through pages of musical score data in an electronic musical display device, comprising the steps of:

inputting music score data into a memory device to store the music score data;

segregating the music score data stored in the memory device into sections by allowing a user to select said sections;

programming said sections into a performance sequence in accordance with a desired performance determined by said user;

displaying the music score data; and actuating a device to advance the display of the sections in accordance with the performance sequence, wherein said sections can be played in any particular order as determined by said user, including a non-sequential forward or reverse order within the music score data.

11. The method of claim 10, wherein the step of inputting the music score image data into the memory device comprises scanning a musical score and storing the scanned musical score data in the memory device as image data.

12. The method of claim 11, wherein the image data includes musician specific notations.

13. The method of claim 10, wherein the step of actuating a device to progress through the performance plan comprises the musician manipulating an actuator.

14. The method as recited in claim 13, wherein the actuator is a foot pedal.

15. The method of claim 10, wherein said segregating step includes allowing said user to select said sections by highlighting said sections.

16. The method of claim 10, wherein said user includes a musician.

17. A method of programming a performance sequence for displaying a musical score on an electronic display device, said method comprising;

storing music score data in memory;

segregating the music score data into sections by allowing a user to select said sections; and storing a sequence of display for the sections in accordance with a desired performance of the music score determined by said user, wherein said sections can be played in any particular order as determined by said user, including a non-sequential forward or reverse order within the music score data.

18. The method of claim 17, wherein said segregating step includes allowing said user to select said sections by highlighting said sections.

19. The method of claim 17, wherein said user includes a musician.

20. An electronic music display programming device comprising:

input means for inputting music score data;

memory means for storing the inputted music score data;

control means for segregating the music score data into sections by allowing a user to select said sections and for programming said sections into performance sequence data in accordance with a desired performance determined by said user; and recording means for recording the music score data and performance sequence data, wherein said sections can be played in any particular order as determined by said user, including a non-sequential forward or reverse order within the music score data.

21. The electronic music display programming device of claim 20, wherein the input means comprises a scanning device in communication with the control means for inputting the music score data into the memory means as image data.

22. The electronic music display programming device of claim 21, wherein the image data includes musician specific notations.

23. The electronic music display programming device of claim 20, wherein the performance sequence data indicates a progression of sections to be displayed in response to activation of an actuator manipulated by a performer.

24. The electronic music display programming device of claim 20, wherein the sections correspond to pages of the music score.

25. The electronic music display programming device of claim 20, wherein said control means allows said user to select said sections by highlighting said sections.

26. The electronic music display programming device of claim 20, wherein said user includes a musician.

27. An electronic music display device comprising:

means for reading music score data and performance sequence data indicating a display sequence of sections of the music score data by allowing a user to select said sections in accordance with a performance sequence determined by said user;

display means for displaying the music score data;

control means for causing sections of the music score data to be sent to said display means in accordance with the performance sequence data; and actuating means in communication with the control means for advancing the display of the sections in said display sequence, wherein said sections can be played in any particular order as determined by said user, including a non-sequential forward or reverse order within the music score data.

28. The electronic music display device of claim 27, wherein the image data includes musician specific notations.

29. The electronic music display device of claim 27, wherein said display means comprises a display which permits two pages of the music score image data to be viewed simultaneously.

30. The electronic music display device of claim 27, wherein said actuating means comprises an actuator manipulated by the performer.

31. The electronic music display device of claim 30, wherein said actuator comprises a foot pedal.

32. The electronic music display device of claim 27, wherein said means for reading includes means for allowing said user to select said sections by highlighting said sections.

33. The electronic music display device of claim 27, wherein said user includes a musician.

* * * * *